(12) United States Patent
Pierre-Yves

(10) Patent No.: US 9,062,995 B2
(45) Date of Patent: Jun. 23, 2015

(54) METHOD FOR CALIBRATING A DEVICE FOR MEASURING PHASE FRACTIONS OF POLYPHASE FLUID UNDER FLOW CONDITIONS, MEASURING METHOD, AND RELATED DEVICE

(75) Inventor: David Pierre-Yves, Jouy le Moutier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 980 days.

(21) Appl. No.: 13/133,964

(22) PCT Filed: Dec. 11, 2009

(86) PCT No.: PCT/FR2009/052504
§ 371 (c)(1),
(2), (4) Date: Aug. 23, 2011

(87) PCT Pub. No.: WO2010/067038
PCT Pub. Date: Jun. 17, 2010

(65) Prior Publication Data
US 2011/0301899 A1    Dec. 8, 2011

(30) Foreign Application Priority Data
Dec. 11, 2008  (FR) ...................................... 08 58493

(51) Int. Cl.
*G01F 25/00*         (2006.01)
*G01F 1/74*          (2006.01)
(Continued)

(52) U.S. Cl.
CPC .. *G01F 1/74* (2013.01); *G01F 1/44* (2013.01); *G01F 1/58* (2013.01); *G01F 1/64* (2013.01); *G01F 1/66* (2013.01); *G01F 1/661* (2013.01); *G01F 15/08* (2013.01); *G01F 25/0007* (2013.01)

(58) Field of Classification Search
CPC .......... G01N 1/10; G01N 33/20; G01F 25/00; G01F 1/74; G01F 1/84; G01F 1/44; G01F 1/58; G01F 1/64; G01F 25/0007; G01F 1/661; G01F 15/08; B01D 46/46
USPC ......................................................... 702/100
See application file for complete search history.

(56) References Cited

U.S. PATENT DOCUMENTS

| 4,282,760 A | 8/1981 | Pitts, Jr. et al. |
| 5,555,190 A * | 9/1996 | Derby et al. ..................... 702/45 |
| 6,335,959 B1 * | 1/2002 | Lynch et al. ..................... 378/45 |

(Continued)

FOREIGN PATENT DOCUMENTS

| EP | 0478044 | 4/1992 |
| GB | 2323173 | 9/1998 |
| WO | 01/25762 | 4/2001 |

*Primary Examiner* — Mohamed Charioui
*Assistant Examiner* — Ruihua Zhang
(74) *Attorney, Agent, or Firm* — Cameron R. Sneddon

(57) ABSTRACT

This method comprises taking a first pressurized gaseous phase sample in a flow channel and transferring the first sample in the measuring channel. It comprises activating a second sensor to collect a first piece of information representative of the first pressurized sample. The method comprising taking a second pressurized liquid phase sample, transferring the second sample in the measuring channel and activating the second sensor a second piece of information representative of the second pressurized sample. The method comprises the computation of at least one calibration coefficient connecting the property to the or each piece of information received from the sensor, based on the first piece of information and the second piece of information.

15 Claims, 7 Drawing Sheets

(51) Int. Cl.
*G01F 1/44* (2006.01)
*G01F 1/58* (2006.01)
*G01F 1/64* (2006.01)
*G01F 1/66* (2006.01)
*G01F 15/08* (2006.01)

(56) References Cited

U.S. PATENT DOCUMENTS

2007/0006640 A1\* 1/2007 Gysling ........................ 73/61.44
2007/0006727 A1\* 1/2007 Gysling ............................ 95/1

\* cited by examiner

METHOD FOR CALIBRATING A DEVICE FOR MEASURING PHASE FRACTIONS OF POLYPHASE FLUID UNDER FLOW CONDITIONS, MEASURING METHOD, AND RELATED DEVICE

The present invention concerns a method for calibrating under flow conditions a device for measuring at least one property, in particular phase fractions, of a pressurized polyphase fluid circulating in a pipe, the property being computed using at least one piece of information received from a first sensor placed opposite the fluid circulating in the pipe, the polyphase fluid comprising at least one liquid phase and a gaseous phase.

Such a method is in particular intended to be implemented in a polyphase flowmeter used to measure the individual flow rates of a polyphase fluid circulating in a hydrocarbon production exploitation, such as an oil or natural gas well.

A polyphase flow meter generally comprises a venturi through which the polyphase fluid to be measured circulates.

To compute the total mass and/or volume flow rate of the flowing fluid, the pressure difference between the neck of the venturi and a point situated upstream of the neck is measured. Moreover, the individual densities and/or the proportions of each of the phases circulating in the neck of the venturi are computed from information received from a sensor placed opposite the neck of the venturi or in another location of the device.

Such a sensor for example comprises a receiver for receiving gamma photons passing through the polyphase fluid, said photons being emitted by a source placed opposite the sensor. The sensor is able to provide a count of the gamma photons received after passage in the fluid.

It is, however, necessary to connect the information on the number of counts per unit of time received by the gamma photon sensor to the property for which a measurement is desired, such as the density or the area occupied by each of the gaseous and liquid phases of the polyphase fluid circulating opposite the sensor. To that end, calibration coefficients are used to mathematically connect the information received from the sensor to the desired property.

To determine these calibration coefficients, a method of the aforementioned type is used.

In this method, liquid monophase samples of each of the phases of the polyphase fluid are sampled in the pipe and are brought to atmospheric pressure. Then, while the equipment is at atmospheric pressure, the measuring stream is successively filled with each liquid monophase sample taken at atmospheric pressure. A calibration coefficient formed by the mass and/or linear attenuation of each monophase sample is computed based on the number of counts collected by the first sensor for each sample. In that case, the density of each of the liquid phases at atmospheric pressure is necessary and is measured using suitable instrumentation.

Such a method disrupts production, since it is necessary to interrupt the circulation of the fluid in the pipe. Moreover, it is not very precise, since it is based on monophase samples at atmospheric pressure that are not very representative of the fluid circulating in the pipe. Lastly, during the measurement, the channel is open at atmospheric pressure, which makes it impossible to measure the properties of the gaseous phase.

To offset these problems, it is possible to use theoretical calibration coefficients, for each energy developed by the gamma photon source. These theoretical coefficients are computed from the composition of each of the liquid or gaseous fluids. Correlation tables are available to that end, in particular those from the NIST or LOS ALAMOS.

All of these methods are imprecise and not very practical to carry out.

One aim of the invention is therefore to provide a calibration method for measuring at least one property of a polyphase fluid circulating in a pipe, that is easy to carry out, while being more precise than the existing methods.

To that end, the invention relates to a method as defined above, the method comprising the following steps:
  circulation of the pressurized polyphase fluid through a flow channel connected to the pipe;
  connecting a measuring channel on the flow channel via a valve manifold, the measuring channel being provided with a second sensor delivering at least one piece of information similar to that delivered by the first sensor;
  taking a first pressurized gaseous phase sample in the flow channel and transferring the first pressurized gaseous phase sample in the measuring channel through the valve manifold;
  activating the second sensor to collect a first piece of information representative of the first pressurized sample present in the measuring channel;
  taking at least one second sample of pressurized liquid phase and transferring the second pressurized sample into the measuring channel through the valve manifold;
  activating the second sensor to collect, for the second sample, at least one second piece of information representative of the second pressurized sample present in the measuring channel opposite the second sensor;
  computing at least one calibration coefficient connecting the property to the or each piece of information received from the first sensor, based on the first piece of information and the or each second piece of information.

The method according to the invention can comprise one or several of the following features, considered alone or according to all technically possible combinations:
  the polyphase fluid comprises an aqueous liquid phase and an oily liquid phase, the step for activating the second sensor comprising the successive passage of the oily liquid phase and the aqueous liquid phase opposite the second sensor to successively collect a second piece of information representative of the oily liquid phase and a second piece of information representative of the aqueous liquid phase;
  it comprises taking a second unique liquid phase sample comprising the oily liquid phase and the aqueous liquid phase, and the sedimentation in a vertical part of the measuring channel of the oily liquid phase above the aqueous liquid phase;
  it comprises, when the second sensor is activated, the implementation of a stability test on the value of the signal received from the second sensor to determine whether the signal received from the second signal is stable, and the collection of each second piece of representative information when the signal received from the second sensor is stable;
  the measuring channel is permanently connected on the flow channel, the connection step being carried out before making the polyphase fluid circulate in the flow channel;
  the measuring channel is removably mounted on the flow channel, the connection of the measuring channel being done after making the polyphase fluid circulate in the flow channel; and
  the measured property is chosen among the individual section of the gaseous phase and of the or each liquid phase in the pipe, and the individual density of each phase, the first sensor being chosen among a receiver for receiving gamma photons emitted by a gamma ray source, a receiver for receiving an electromagnetic signal emitted by an electromagnetic radiation source with a frequency below 60 GHz, an impedance measurement sensor, a microwave measurement sensor, and an optical measurement sensor.

The flow channel has selective collection points, for the gaseous phase and the liquid phase, respectively, connected to a gaseous phase transport channel and a liquid phase transport channel of the valve manifold that emerges in the measuring channel.

This invention also relates to a process for measuring at least one property of a polyphase fluid continuously circulating in a pipe, characterized in that it comprises the following steps:
  calibrating the measurement by carrying out a calibration method as defined above, the polyphase fluid continuously circulating through the flow channel;
  continuously measuring the property comprising the following steps:
    activating the first sensor to collect a piece of information representative of the polyphase fluid circulating in the pipe;
    computing the measured parameter based on the or each piece of representative information received from the first sensor and from the or each calibration coefficient determined during the calibration step.

The invention also relates to a device for measuring at least one property of a pressurized polyphase fluid continuously circulating in a pipe, the polyphase fluid comprising at least one liquid phase and at least one gaseous phase, the device comprising a measuring assembly including:
  a section of the pipe provided with a first sensor capable of interacting with the fluid circulating in the section of the pipe to create at least one piece of information, and
  a means for computing the property from the information received from the first sensor,
  characterized in that the device comprises a calibration assembly including:
  a flow channel of the pressurized polyphase fluid connected to the pipe to allow the continuous circulation of at least part of the polyphase fluid circulating in the pipe during a calibration step;
  a measuring channel separate from the flow channel, the measuring channel being provided with a second sensor delivering at least one piece of information similar to that delivered by the first sensor;
  a valve manifold connecting the measuring channel to the flow channel, the valve manifold comprising at least one pressurized transport channel for a first pressurized gaseous phase sample connecting a gaseous phase collection point in the flow channel to the measuring channel and to at least one transport channel for transporting a second pressurized liquid phase sample connecting a liquid phase collection point on the flow channel to the measuring channel.

The device according to the invention can comprise one or several of the following features:
  the flow channel is formed by said section of the pipe, provided with the first sensor, the measuring channel being formed by a bypass of the pipe, the second sensor being separate from the first sensor;
  the measuring channel is removably mounted on the flow channel via the valve manifold;
  the second sensor is made up of the first sensor, the measuring channel being formed by said section of the pipe provided with the first sensor, the flow channel being formed by a bypass of the pipe bled upstream and downstream of the measuring channel; and
  the pipe defines a first venturi opposite the first sensor, the measuring channel defining a second venturi opposite the second sensor.

The invention will be better understood upon reading the following description, provided solely as an example, and done in reference to the appended drawings, in which.

Figure 1:
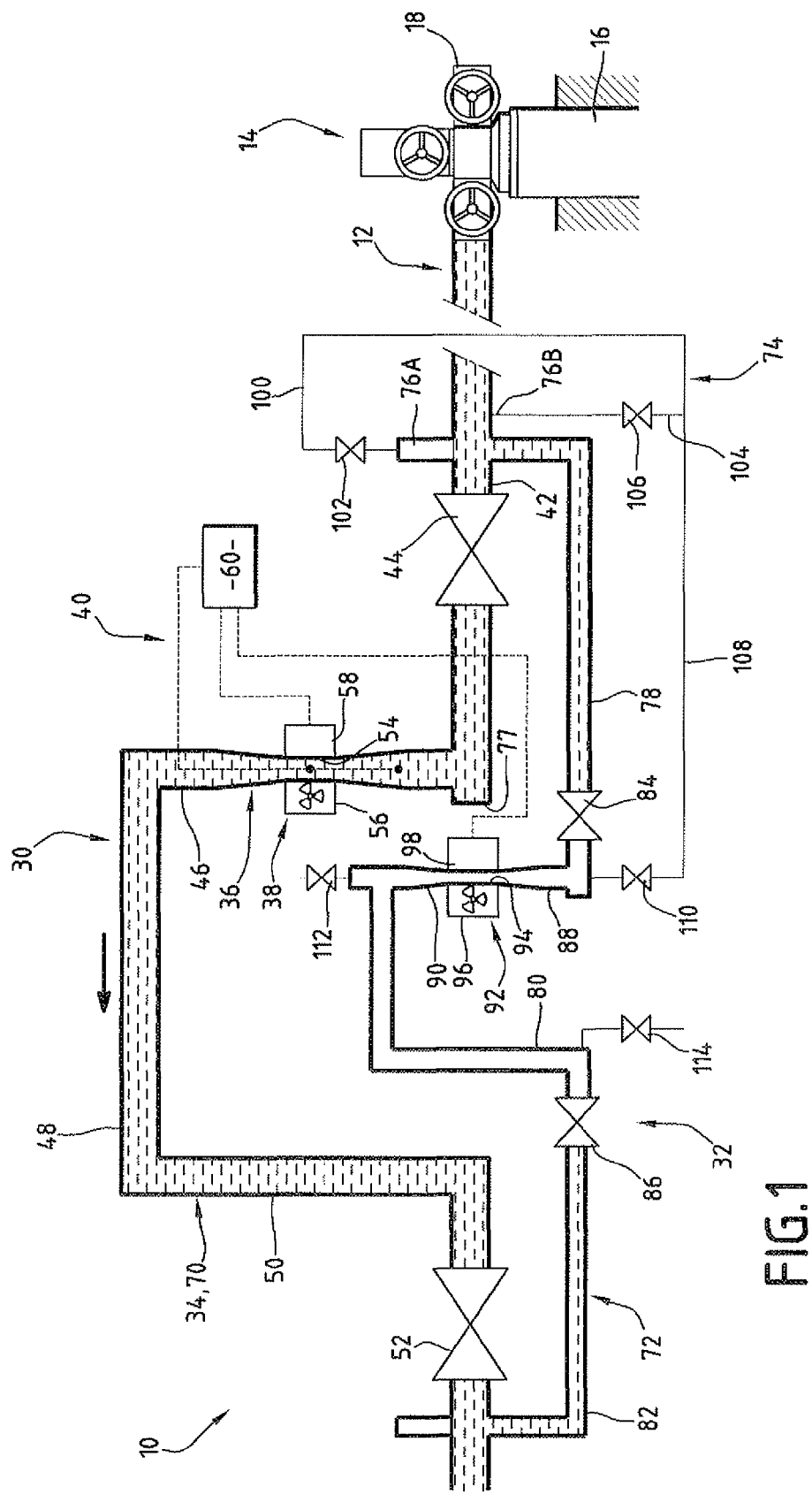
FIG. 1 is a diagrammatic cross-sectional view along a vertical plane of a first measuring device according to the invention during an initial step for carrying out the calibration method.
Figure 2:
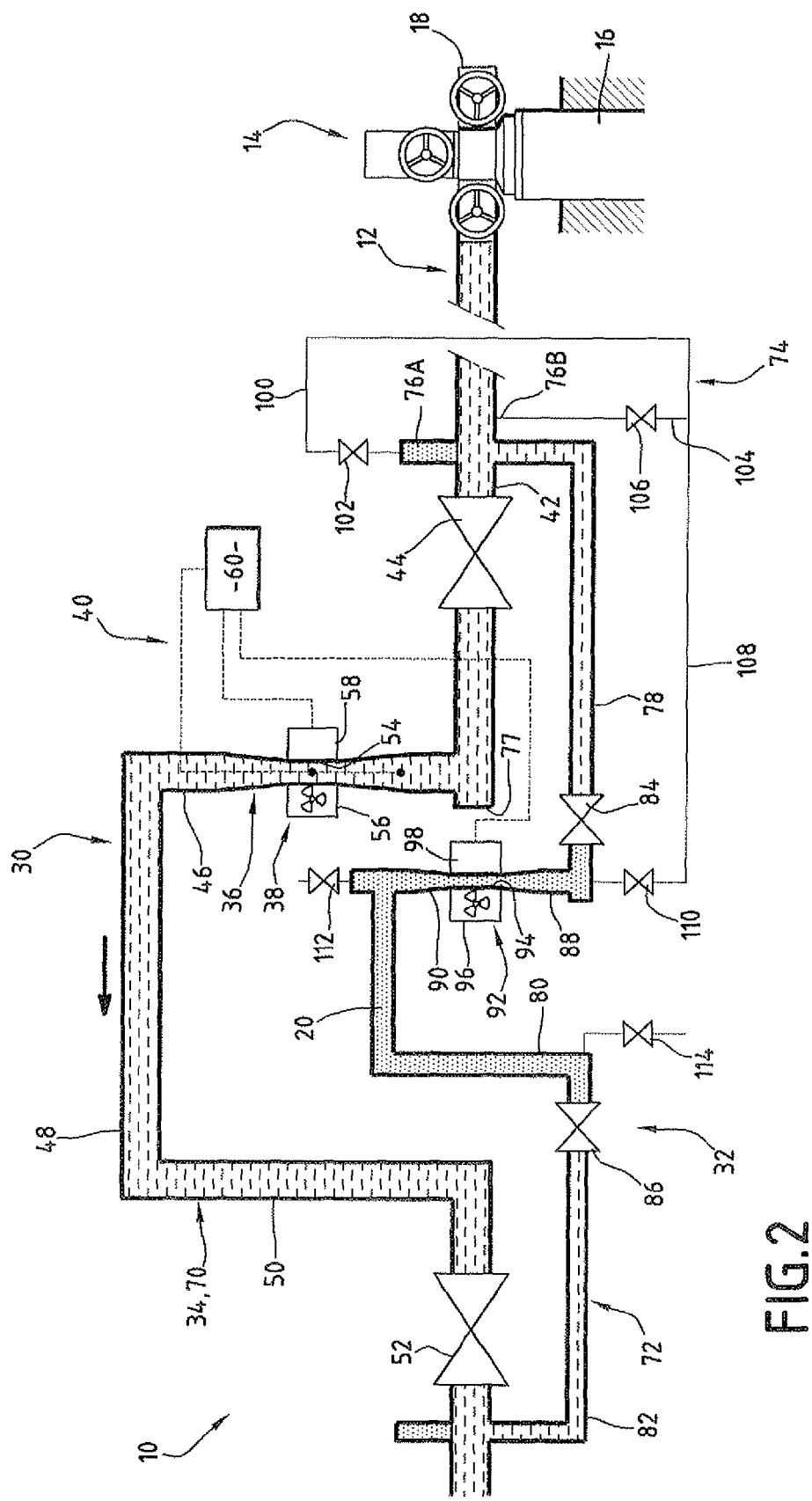
FIG. 2 is a view similar to FIG. 1, during a step for collecting information representative of a gaseous phase sample.
Figure 3:
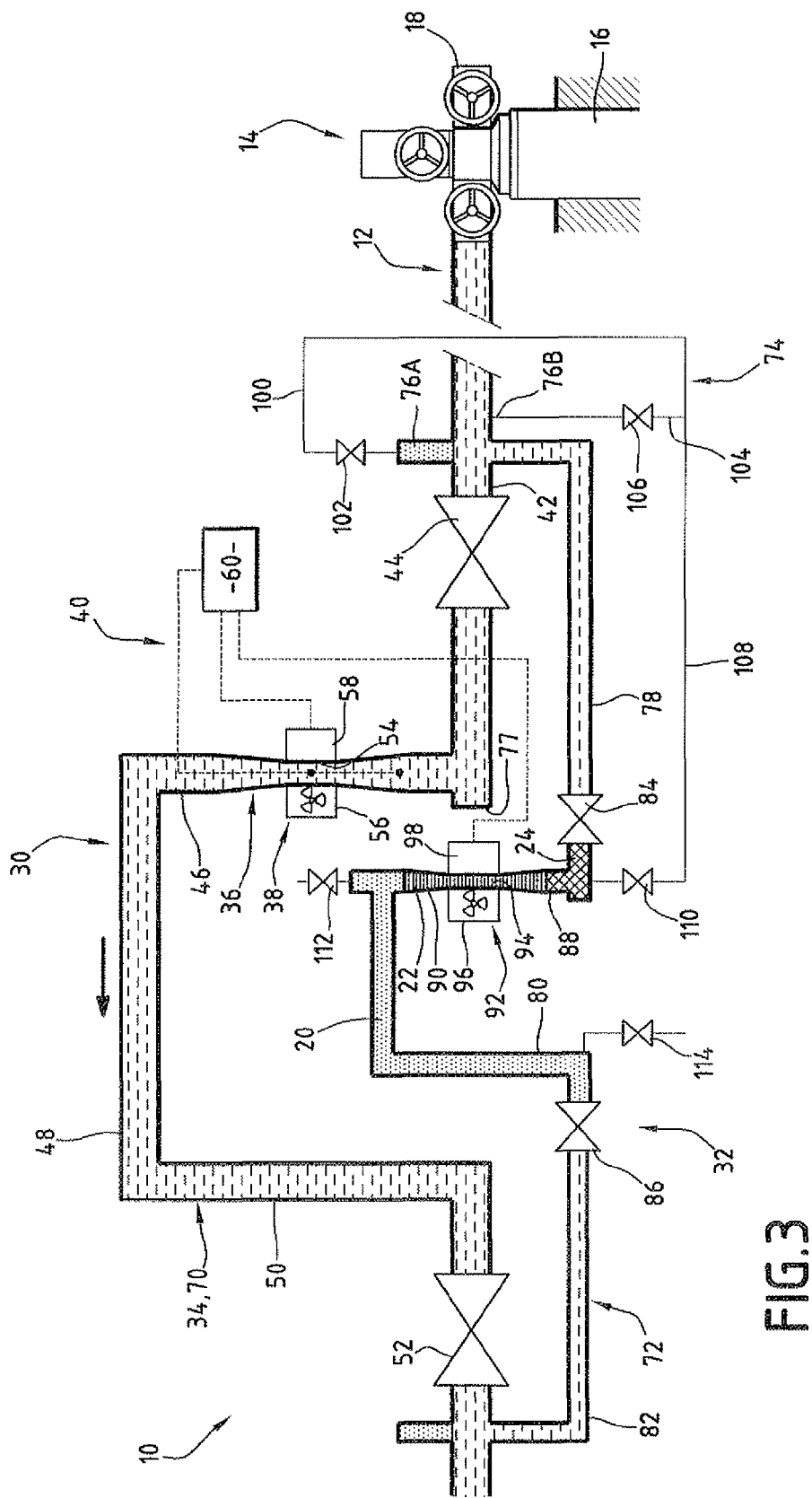
FIG. 3 is a view similar to FIG. 2, during the collection of a piece of information representative of an oily liquid phase sample.
Figure 4:
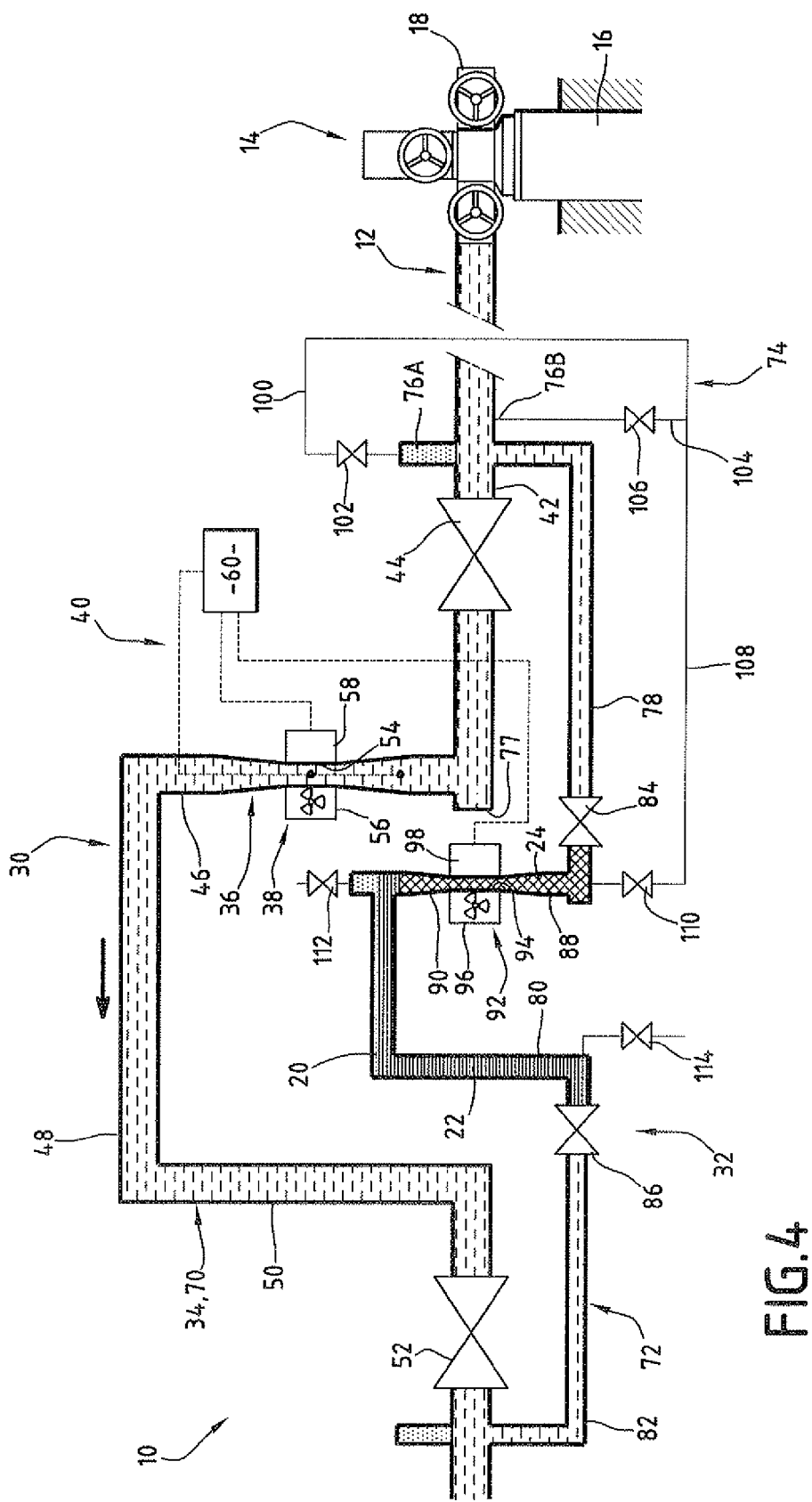
FIG. 4 is a view similar to FIG. 2, during the collection of a piece of information representative of an aqueous liquid phase sample.

In the following, the terms "upstream" and "downstream" refer to the normal flow direction of a fluid in a pipe.

A first measuring device 10 according to the invention is shown in FIGS. 1 to 4.

This device 10 is intended to be serially mounted on a transport pipe 12 for a pressurized polyphase fluid in an exploitation installation for that fluid, for example a hydrocarbon exploitation installation 14 illustrated diagrammatically in the Figures.

This installation 14 in particular comprises a well 16 for extracting polyphase fluid in the subsoil covered by a wellhead 18 diagrammatically shown in FIGS. 1 to 4.

The pipe 12 connects the wellhead 18 to a reception and storage installation of the polyphase fluid (not shown) situated away from the wellhead.

The polyphase fluid is for example a mixture of hydrocarbons extracted from the subsoil. In this example it comprises a gaseous phase 20, an oily liquid phase 22, visible in FIGS. 3 and 4, and an aqueous liquid phase 24, visible in FIG. 4.

The polyphase fluid flows under pressure in the transport pipe 12 between the wellhead 18 and the storage means. The pressure of the polyphase fluid in the pipe 12 is greater than the pressure reigning around the installation 14, i.e. the atmospheric pressure. This pressure is for example greater than 5 bars and advantageously between 10 bars and 700 bars.

As seen above, the first measuring device 10 is serially mounted on the pipe 12. It comprises a polyphase flowmeter assembly 30, and in the example shown in FIGS. 1 to 4, a calibration assembly 32 permanently mounted on the pipe 12, in parallel with the polyphase flowmeter assembly 30.

Advantageously, the polyphase flowmeter assembly 30 and the calibration assembly 32 are mounted secured on a same frame (not shown) to be transported jointly to the installation 14.

The polyphase flowmeter assembly 30 comprises a section 34 of the pipe 12 in the shape of a U facing downwards, a first venturi 36, a first gamma measurement device 38 and a sensor 40 for measuring differential pressure through the venturi 36.

The section 34 is inserted on the pipe 12, of which it forms a portion. It comprises a substantially horizontal upstream portion 42 provided with an upstream valve 44 for closing the pipe 12, a vertical upstream section 46, and a horizontal upper section 48.

The section 34 also comprises, downstream from the upper section 48, a downstream portion 50 provided with a downstream valve 52 for closing the pipe 12.

The venturi 36 is formed in the upstream vertical portion 46 of the section 34. It comprises a neck 54 with a diameter smaller than an upstream section of the venturi 36.

The gamma measurement device 38 is arranged around the neck 54. It comprises a source 56 for emitting at least one gamma photon beam through the polyphase fluid circulating in the neck 54, and a first sensor 58 for receiving gamma photons emitted by the source and having passed through the polyphase fluid circulating in the neck 54.

In this example, the source 56 is a source delivering a high-energy gamma photon beam, for example greater than 50 keV, and a low-energy gamma photon beam, for example less than 40 keV.

The first sensor 58 is capable of delivering a piece of information relative to the nature of the fluid circulating in the neck 54. In this example this piece of information is made up of a number of high-energy photon counts per unit of time and by a number of low-energy photon counts per unit of time received from the high-energy beam and the low-energy beam, respectively, these photons having passed through the fluid flowing in the neck 54.

Alternatively, the source 56 is a source emitting an electromagnetic radiation with a frequency between 1 MHz and 60 GHz. The sensor 58 is then a detector for detecting the radiation received after reflection in the polyphase fluid. Such a measuring device is for example described in French patent application no. 06 07887 by the Applicant.

Alternatively, the first sensor 58 is chosen among an impedance measurement sensor (capacitance or inductance), a microwave sensor capable of receiving frequencies between 0.3 GHz and 300 GHz, and an optical measurement sensor.

The sensor 40 for measuring the differential pressure is capable of measuring the pressure difference between the neck 54 and the section of the venturi situated upstream of the neck 54.

The sensors 40, 58 are electrically connected to a control and computation unit 60.

According to the invention, the calibration assembly 32 comprises a flow channel 70 for the pressurized polyphase fluid, formed in this example by the section 34 of the measuring assembly 30, a measuring channel 72 distinct from the flow channel 70, and a valve manifold 74 capable of selectively connecting the flow channel 70 to the measuring channel 72 to transfer pressurized fluid samples between the flow channel 70 and the measuring channel 72.

The flow channel 70 is capable of allowing the continuous flow of all of the polyphase fluid circulating in the pipe 12 during the calibration, as will be seen below.

The flow channel 70 has selective collection points 76A, 76B of the gaseous phase 20 and the liquid phase 22, 24, respectively, situated upstream of the upstream closure valve 44.

The gaseous phase collection point 76A is formed by a vertical pipe closed at one end defining a gaseous blanket, bled in an upper portion of the pipe 12.

The liquid phase 22, 24 collection point 76B is formed by a lower bleed point emerging in the pipe 12, situated substantially below the gaseous phase collection point 76A.

In one alternative, the collection point 76B is placed in a plugged T-section 77 placed upstream of and below the venturi 36, downstream of the valve 44.

In the example illustrated in FIG. 1, the measuring channel 72 is formed by a bypass of the pipe 12, permanently mounted in parallel with the flow channel 70. The channel 72 thus comprises an upstream section 78 for connecting to the flow channel 70, an intermediate measuring section 80, and a downstream section 82 for connecting to the flow channel 70.

The upstream section 78 extends between a bleed point situated upstream of the shut-off valve 44 and an upstream shut-off valve 84 of the measuring section 80.

The downstream section extends between a downstream shut-off valve 86 of the measuring section 80 and a bleed point situated downstream of the valve 52 for closing the downstream pipe.

The measuring section 80, like the section 34 of the pipe 12, is substantially in the shape of an upside-down U.

It thus comprises a substantially vertical upstream portion 88 defining a second venturi 90. The section 80 is provided with a second gamma measurement device 92.

The measuring section 80 is connected upstream to the upstream shut-off valve 84 and downstream to the downstream shut-off valve 86.

The second venturi 90 extends in the vertical portion 88. It has dimensions that are identical or homothetic relative to the first venturi 36. Thus, it has a neck 94 with a reduced diameter relative to an upstream section of the venturi 90.

The second measuring device 92 has a second source 96 for emitting gamma photon beams with the same energy as the first source 36, and a second sensor 98 for receiving gamma photons having passed through the fluid circulating in the neck 94.

In this example, the second sensor 98 is distinct from the first sensor 58. It is also connected to the control and computation unit 60.

The second sensor 98 is capable of delivering a piece of measuring information relative to the nature of the fluid flowing in the neck 94. This information is made up, in this example, of a number of high-energy photon counts per unit of time and by a number of low-energy photon counts per unit of time received from the high-energy beam and the low-energy beam, respectively, these photons having passed through the fluid circulating in the neck 94.

Thus, the second sensor 98 is capable of measuring the same physical magnitude as the first sensor 58 and delivering a piece of information similar to that delivered by the first sensor 58, i.e. a number of counts per unit of time.

In the alternative in which the first sensor 58 is a detector for detecting the electromagnetic radiation obtained from a radiation source 56, the second device 92 comprises a source 96 of an electromagnetic radiation identical to that emitted by the radiation source 56, and a second receiving sensor 98 similar to the first sensor 58, capable of measuring the same physical magnitude as the first sensor 58.

In the respective alternatives where the first sensor 40 is an impedance measurement sensor (capacitance or inductance), a microwave sensor, or an optical measurement sensor, the second sensor 98 is an impedance measurement sensor (capacitance or inductance), a microwave sensor, or an optical measurement sensor, respectively.

The valve manifold 74 comprises a gaseous phase 20 transport channel 100, provided with a gaseous phase intake valve 102, a liquid phase 22, 24 transport channel 104 provided with a liquid phase intake valve 106, and, in this example, a shared intake channel 108 for samples in the measuring section 80, provided with an intake valve 110 in the measuring section 80.

The manifold 74 also comprises a valve 112 for discharging gas outside the measuring section 80 and a valve 114 for emptying liquid outside the measuring section 80.

The gaseous phase transport channel 100 connects the gaseous phase collection point 76A to the shared intake channel 108. Likewise, the liquid phase transport channel 104 connects the liquid phase collection point 76B to the intake channel 108.

The intake channel 108 emerges in a lower end of the vertical portion 88 situated under the second venturi 90.

The discharge valve 112 emerges in an upper end of the vertical portion 88, situated above the second venturi 90.

The emptying valve 114 emerges in a downstream portion of the measuring section 80 situated downstream from the vertical portion 88.

As will be seen below, the valves of the manifold 74 are capable of being controlled to make it possible, without stopping the continuous flow of polyphase fluid in the flow channel 70, to take a pressurized gaseous phase sample at the collection point 76A and transport it towards the measuring channel 72 through the transport channel 100 and the intake channel 108.

The valves of the manifold 74 are also capable of being controlled to make it possible, without stopping the continuous flow of polyphase fluid in the flow channel 70, to take a pressurized liquid phase sample at the collection point 76B and transport it towards the measuring channel 72 through the transport channel 104 and the intake channel 108.

A first measuring method according to the invention will now be described.

This method comprises a step for calibration the measurement carried out using a calibration method according to the invention, and a step for measuring the polyphase fluid flowing in the channel 12.

In the calibration step, the calibration method successively comprises an empty pipe measuring phase, a phase for measuring the gaseous phase 20, a phase for measuring the oily liquid phase 22, then a phase for measuring the aqueous liquid phase 24.

Initially, during the empty pipe measuring phase shown in FIG. 1, the measuring section 80 is isolated. To that end, the shut-off valves 84, 86 are closed. The gas discharge valve 112 is vented to discharge any liquid or residual gas found in the measuring section 80. The measuring section 80 then contains air present around the pipe 12.

The measuring device 92 is then turned on. The source 96 emits a high-energy gamma photon beam, for example between 50 keV and 600 keV, and a low-energy gamma photon beam, for example between 10 keV and 50 keV.

The second sensor 98 is activated to receive the number of counts $I_0^{HE}$ of high-energy photons per unit of time having passed through the neck 94 and the number $I_0^{LE}$ of low-energy photon counts per unit of time having passed through the neck 94 when the neck 94 is empty, from the respective numbers of counts per unit of time when the neck 94 is filled with air at atmospheric pressure, and from the pressure and temperature of the air contained in the neck 94.

Simultaneously, the pressurized polyphase fluid flows continuously in the transport pipe 12. This fluid continuously passes through the section 34 forming the flow channel 70 through the closure valves 44 and 52, which are then open.

During this flow, a quantity of gaseous phase 20 builds up at the collection point 76A, and a quantity of liquid phase 22, 24 builds up at the sampling point 76B.

At the beginning of measurement of the gaseous phase 20, the manifold 74 is controlled to allow the transfer of a pressurized gaseous phase 20 sample towards the measuring channel 72.

To that end, the gaseous phase intake valve 102 is open, while the liquid phase intake valve 106 is closed.

The pressured gaseous phase 20 collected at the collection point 76A then passes through the transport pipe 100, then the shared intake pipe 108 up to the intake valve 110.

The emptying valve 114 is then opened and the gas discharge valve 112 is closed. The intake valve 110 is then opened to purge the measuring section 80 through the circulation of gaseous phase 20 between the intake valve 110 and the emptying valve 114.

Once this is done, the emptying valve 114 is closed to pressurize the measuring section 80.

The pressure in that section 80 gradually increases until it is equal to the pressure of the gaseous phase 20 at the venturi 36, minus the pressure loss in the manifold 76. This pressure is greater than the atmospheric pressure and is for example between 5 bars and 700 bars.

When the pressure measured in the measuring section 80 is substantially constant, the measurements done by the second measuring device 92 are taken into account.

The source 96 emits a beam of high-energy photons and a beam of low-energy photons, and the second sensor 98 collects a first piece of information representative of the gaseous phase sample 20 present exclusively in the neck 94.

In this example, this piece of information is formed by the number of counts $I_g^{HE}$ of high-energy gamma photons per unit of time having passed through the neck 94 and the number $I_g^{LE}$ of low-energy gamma photon counts per unit of time having passed through the neck 94, when said neck 94 contains only the gaseous phase 20.

On this basis, the control and computation unit 60 computes the calibration coefficients formed by gas mass attenuations $\mu_g^{HE}$ and $\mu_g^{LE}$ for each energy using the equation system below:

$$\begin{cases} \mu_g^{HE} = \dfrac{1}{\rho_g d} \ln \dfrac{I_0^{HE}}{I_g^{HE}} \\ \mu_g^{LE} = \dfrac{1}{\rho_g d} \ln \dfrac{I_0^{LE}}{I_g^{LE}}, \end{cases} \quad (1)$$

in which $\rho_g$ is the density of the gaseous phase 20, which can for example be measured by taking a sample in the section 80, and d is the diameter of the neck 94.

Then, at the beginning of the measuring phase of the oily liquid phase 20, the liquid phase intake valve 106 is opened to make the pressurized liquid phase 22, 24 comprising a mixture of oily liquid phase 22 and aqueous liquid phase 24 penetrate the transport pipe 104, then the intake pipe 108 to the intake valve 110.

Then, the intake valve 110 is opened, following a gradual opening of the gas discharge valve 112 to keep the pressure in the measuring section 80 substantially constant and equal to the pressure of the polyphase fluid in the channel 12, minus the pressure loss in the manifold 74. This pressure is greater than the atmospheric pressure, and is for example between 5 bars and 700 bars.

The liquid phases 22, 24 therefore penetrate the measuring section 80 without undergoing a significant depressurization and without being flashed. The composition of the liquid phase 22, 24 sample introduced into the section 80 is therefore representative of the liquid phases 22, 24 present in the polyphase fluid circulating in the pipe 12.

The liquid phase 22, 24 level gradually increases in the vertical portion 88 until a significant decrease is observed in the number of counts measured by the second sensor 98. "Significant decrease" refers to a decrease of at least 10% of the value of the number of counts, as illustrated by the phase 120 in FIG. 7.

Then, the phases 22, 24 are left idle, to allow sedimentation of the oily liquid phase 22, which is placed above the aqueous phase 24, opposite the neck 94 of the venturi 92.

Figure 7:
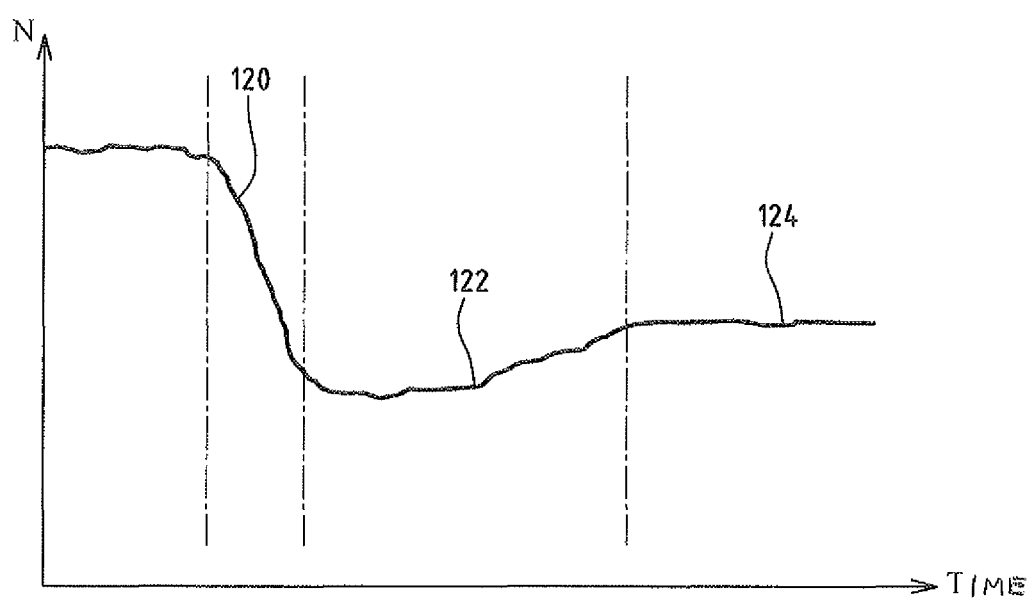
FIG. 7 is a curve showing the number of counts as a function of time detected by a detector of the device of FIG. 1 during a stability test.

A stability test of the measurement of the second piece of information collected by the second sensor 98 is then performed as illustrated in FIG. 7.

This test for example consists of measuring the value in percentage of the fluctuations of counts per unit of time over a given time. If the value of the fluctuations is above a threshold value, for example equal to 5%, as in the phase 122 illustrated in FIG. 7, the value is considered unstable, while if the fluctuation is below a threshold value as in the phase 124, in FIG. 7, the value is considered stable.

When the value is stable, the second sensor 98 collects a second piece of information representative of the oily liquid phase, i.e. the number of counts per unit of time $I_{oil}^{HE}$, $I_{oil}^{LE}$ received on the second sensor 98 and coming from the flow of high-energy gamma photons and the flow of low-energy gamma photons, when solely the oily liquid phase is present in the neck 94 opposite the second sensor 98.

On this basis, the unit 60 computes the calibration coefficients formed by mass attenuations $\mu_{oil}^{HE}$ and $\mu_{oil}^{LE}$ of the oily liquid phase for each energy, via equation system (2) below:

$$\begin{cases} \mu_{oil}^{HE} = \frac{1}{\rho_{oil} d} \ln \frac{I_0^{HE}}{I_{oil}^{HE}} \\ \mu_{oil}^{LE} = \frac{1}{\rho_{oil} d} \ln \frac{I_0^{LE}}{I_{oil}^{LE}} \end{cases} \quad (2)$$

in which $\rho_{oil}$ is the density of the oily phase 20, which can be measured for example by taking a sample in the section 80. Alternatively, $\rho_{oil}$ is obtained by the measurement $$\rho_{oil} = \frac{\Delta p}{gh}$$

done in statistics where $\Delta p$ is the pressure difference through the venturi 92, h is the distance separating the two pressure captures through the venturi 92, and g is the acceleration of the gravity.

Once this is done, the measuring phase of the aqueous liquid phase 24 is then done. To that end, the liquid intake valve 106 and the intake valve 110 are opened to push the aqueous liquid phase 24 up to the neck 94 of the venturi 90.

A stability test as described before is done again.

When this test determines that the value measured by the second sensor 98 is stable, the second sensor 98 collects a second piece of information relative to the aqueous liquid phase 24 present in the neck 94.

This piece of information is formed by the number of counts $I_w^{HE}$ and $I_w^{LE}$ received by the second sensor 98 and coming respectively from the flow of high-energy gamma photons and the flow of low-energy gamma photons, when the aqueous liquid phase 24 is present only in the neck 94 opposite the second sensor 98.

Calibration coefficients are then computed by the unit 60. These calibration coefficients are formed by the mass attenuations of the aqueous liquid phase $\mu_w^{HE}$ and $\mu_w^{LE}$ for each energy, as determined by equation system (3) below:

$$\begin{cases} \mu_w^{HE} = \frac{1}{\rho_w d} \ln \frac{I_0^{HE}}{I_w^{HE}} \\ \mu_w^{LE} = \frac{1}{\rho_w d} \ln \frac{I_0^{LE}}{I_w^{LE}}, \end{cases} \quad (3)$$

in which $\rho_w$ is the density of the aqueous liquid phase 24, which can for example be determined by taking a sample in the section 80, or by measuring the differential pressure $\Delta \rho$ through the venturi 92, described above.

In the case where the polyphase fluid contains a low water content, it is sometimes necessary to open the emptying valve 114 to discharge part of the oily liquid phase 22 outside the measuring section 80, in order to allow the aqueous liquid phase 24 to rise back up to the second venturi 94.

Once all of the calibration coefficients are determined, the step for measuring the relative surface sections of the phases 20 to 24 of the polyphase fluid circulating in the pipe 12 can then begin.

In that step, all of the valves 102, 106, 110, 112, 114 of the manifold 74 are closed. The pressurized polyphase fluid continuously flows through the pipe 12 in the section 34, in particular through the neck 54 of the first venturi 36.

The measuring device 38 is then turned on. The source 56 emits a beam of high-energy gamma photons and a beam of low-energy photons, with respective energies substantially identical to the beams emitted by the source 96 of the second measuring device 92 during the calibration step.

The first sensor 58 then measures a piece of information representative of the polyphase fluid passing through the neck 54 of the first venturi 36. This information is formed by the number of counts $I^{HE}$, $I^{LE}$ received on the first detector 58 per unit of time over a given sampling period coming respectively from the high-energy beam and the low-energy beam.

The respective fractions $\alpha_g$, $\alpha_{oil}$, $\alpha_w$ of each phase 20, 22, 24 of the polyphase fluid circulating in the pipe 12 are then determined by the resolution of equation system (4) below:

$$\begin{bmatrix} \rho_w \cdot \mu_w^{HE} & \rho_{oil} \cdot \mu_{oil}^{HE} & \rho_g \cdot \mu_g^{HE} \\ \rho_w \cdot \mu_w^{LE} & \rho_{oil} \cdot \mu_{oil}^{LE} & \rho_g \cdot \mu_g^{LE} \\ 1 & 1 & 1 \end{bmatrix} \cdot \begin{pmatrix} \alpha_w \\ \alpha_{oil} \\ \alpha_g \end{pmatrix} = [A] \cdot \begin{pmatrix} \alpha_w \\ \alpha_{oil} \\ \alpha_g \end{pmatrix} \quad (4)$$

$$= \begin{pmatrix} \frac{1}{d} \ln \frac{I_0^{HE}}{I^{HE}} \\ \frac{1}{d} \ln \frac{I_0^{LE}}{I^{LE}} \\ 1 \end{pmatrix}$$

based on the calibration coefficients and the individual densities determined during the calibration step using the method according to the invention.

The calibration method according to the invention therefore makes it possible to perform a monophase calibration of each of the phases of the polyphase fluid under the pressure and temperature conditions of the polyphase fluid flowing in the pipe 12, which offers samples that are very representative of the fluid flowing in the pipe 12. This advantageous result is obtained simply in the measuring device 10 according to the invention.

The results obtained from this calibration are therefore reliable and more precise than those that could be obtained using samples at atmospheric pressure on fluids not representative of the polyphase fluids flowing in the pipe 12, or by tables of coefficients that are theoretical and above all impossible to obtain experimentally for gas at atmospheric pressure.

Alternatively, when the respective surface fractions $\alpha_g$, $\alpha_{oil}$, $\alpha_w$ of each phase 20, 22, 24 of the polyphase fluid are known, the individual densities $\rho_g$, $\rho_{oil}$, $\rho_w$ are determined during the measuring step.

In the embodiment of FIGS. 1 to 4, the measuring assembly 30 is formed in the section 34 of the pipe 12 with a diameter larger than that of the bypass forming the measuring channel 72.

Alternatively, in particular when the fluid flow rate is low, the measuring assembly 30 can be formed by the bypass of the channel 12, which then receives all of the fluid coming from the wellhead. The calibration assembly 32 is then formed by the section 34 of the pipe 12.

Figure 5:
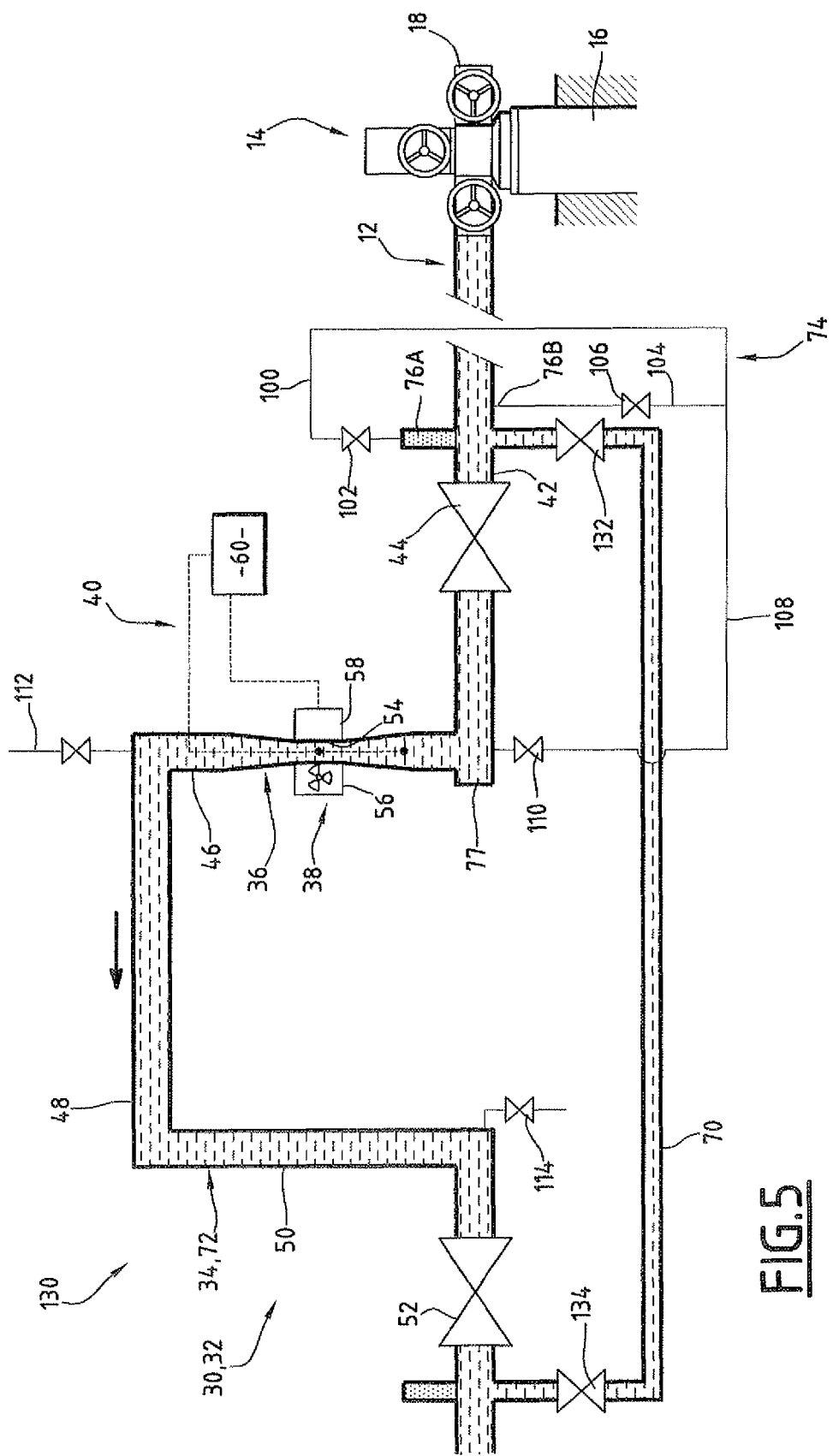
FIG. 5 is a view similar to FIG. 1 of a second measuring device according to the invention.

A second measuring device 130 according to the invention is shown in FIG. 5. Unlike the first device 10, the same venturi 36 is used in the calibration assembly 32 and in the polyphase flowmeter assembly 30, during the calibration step and the measuring step, respectively.

The device 130 comprises a single gamma measuring device 38, comprising a single source 56 and a single detector 58 that is used during the calibration step and the measuring step.

Moreover, the measuring channel 72 is formed by the upside-down U-shaped section 34 of the pipe 12. The measuring section 80 is defined between the valves 44, 52 and can be selectively isolated by activating the upstream 44 and downstream 52 closure valves.

The flow channel 70 is formed during the calibration step by a bypass of the pipe 12 provided without a gamma measurement sensor, which extends between a bleed point situated upstream of the upstream closure valve 44 and a bleed point situated downstream of the downstream closure valve 52.

This bypass is provided with shut-off valves 132, 134 and allows the passage of any fluid present in the pipe 12.

Moreover, the intake pipe 108 of the manifold 74 emerges in a lower end of the vertical portion 46 of the section 34 of the pipe 12.

The gas discharge valve 112 emerges in an upper end of the vertical portion 46 and the emptying valve 114 emerges in a lower portion of the downstream portion 50.

The second measuring method carried out using the second device 130 differs from the first measuring method in that, during the calibration step, the shut-off valves 134 are open. The polyphase fluid then flows continuously through the bypass of the pipe 12 forming the flow channel 70.

The closure valves 44, 52 of the section 34 of the pipe 12 are isolated to isolate the measuring section 80.

Then, the phases for measuring the gaseous phase 20, the liquid phase 22 and the aqueous liquid phase 24 are carried out as previously described using the single venturi 36, bringing monophase samples of the phases 20, 22, 24 opposite the first sensor 58 using the valve manifold 74, as previously described.

Once the calibration coefficients are obtained, the shut-off valves 132, 134 are closed and the closure valves 44, 52 are opened to make the polyphase fluid flow through the section 34.

The measuring assembly 30 is then used as previously described in the measuring step.

Figure 6:
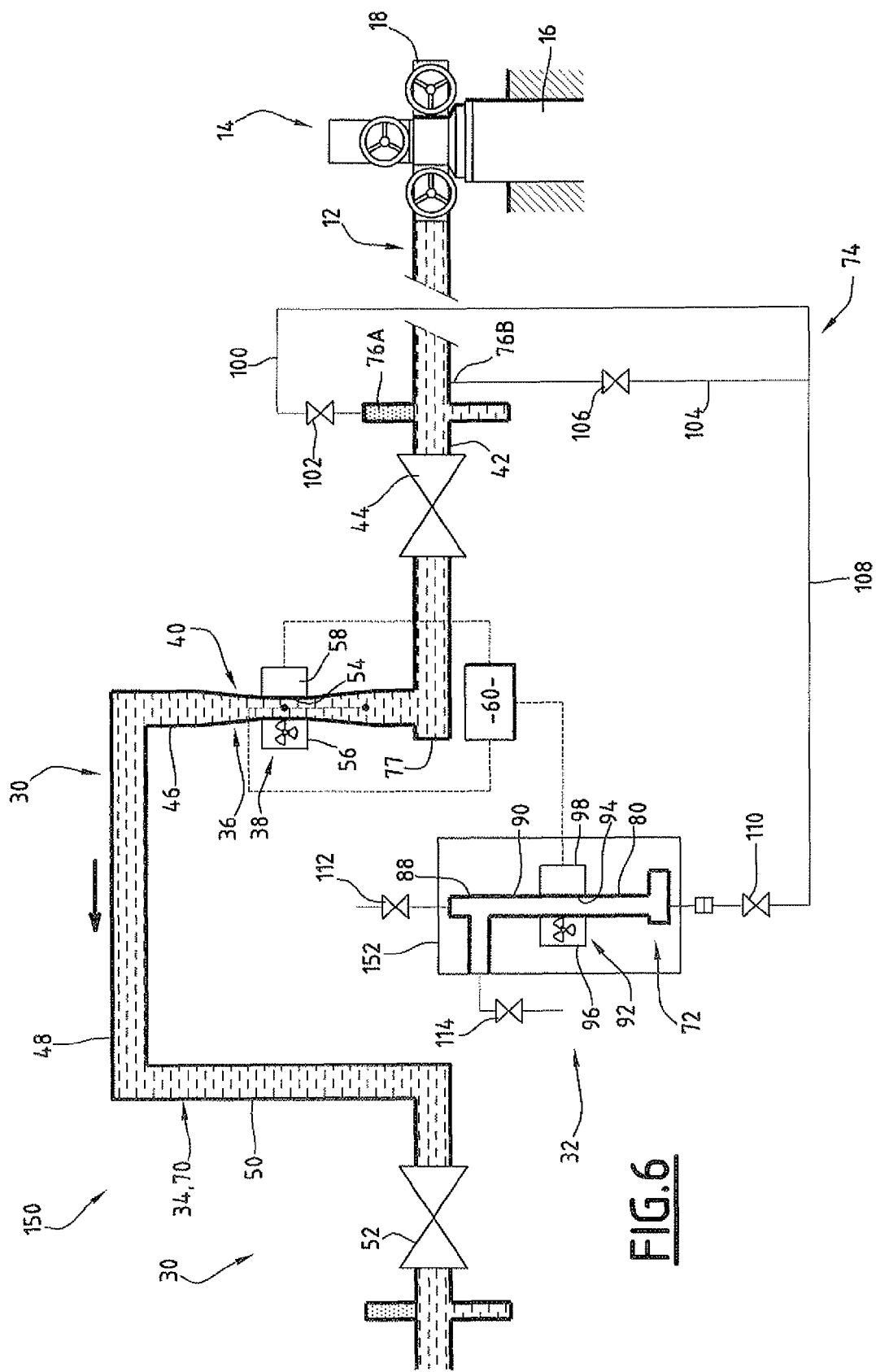
FIG. 6 is a view similar to FIG. 1 of a third measuring device according to the invention.

A third device 150 according to the invention is shown in FIG. 6. This third device 150 differs from the first device 10 in that the measuring channel 72 of the calibration assembly 32 is arranged in a model 152 removable and reversibly connected to the valve manifold 74.

The model 152 can for example be carried by an operator.

The measuring method using the third device 150 thus comprises a step for mounting the model 152 on the valve manifold 74 while polyphase fluid already flows through the section 34 of the pipe 12.

It then comprises a calibration step carried out similarly to the first method for determining the calibration coefficients.

The measuring method then comprises the disassembly of the model 152 away from the valve manifold 74 before proceeding with the measuring steps.

The invention claimed is:

1. A method for calibrating, under flow conditions, a device for measuring at least one property of a pressurized polyphase fluid circulating in a pipe, the property being computed using at least one piece of information received from a first sensor placed opposite the fluid circulating in the pipe, the polyphase fluid comprising at least one liquid phase and a gaseous phase, the method comprising:
    circulating the pressurized polyphase fluid through a flow channel connected to the pipe;
    connecting a measuring channel to the flow channel via a valve manifold, the measuring channel being provided with a second sensor delivering at least one piece of information similar to that delivered by the first sensor;
    taking a first sample of pressurized gaseous phase from the flow channel and transferring the first sample of pressurized gaseous phase to the measuring channel through the valve manifold;
    activating the second sensor to collect a first piece of information representative of the first sample of pressurized gaseous phase present in the measuring channel;
    taking at least one second sample of pressurized liquid phase from the flow channel and transferring the second pressurized sample to the measuring channel through the valve manifold;
    activating the second sensor to collect at least one second piece of information representative of the at least one second sample of pressurized liquid phase present in the measuring channel opposite the second sensor;
    computing at least one calibration coefficient connecting the property to the at least one piece of information received from the first sensor, based on the first piece of information and the at least one second piece of information.

2. The method according to claim 1, wherein the polyphase fluid comprises an aqueous liquid phase and an oily liquid phase, and wherein activating the second sensor comprises the successive passage of the oily liquid phase and the aqueous liquid phase opposite the second sensor to successively collect a second piece of information representative of the oily liquid phase and a second piece of information representative of the aqueous liquid phase.

3. The method according to claim 2, further comprising:
    taking a second unique liquid phase sample comprising the oily liquid phase and the aqueous liquid phase, and the sedimentation in a vertical part of the measuring channel of the oily liquid phase above the aqueous liquid phase.

4. The method according to claim 3, further comprising: when the second sensor is activated, implementing a stability test on the value of the signal received from the second sensor to determine whether the signal received from the second signal is stable, and collecting each second piece of representative information when the signal received from the second sensor is stable.

5. The method according to claim 1, wherein the measuring channel is permanently connected to the flow channel, the connecting being carried out before making the polyphase fluid circulate in the flow channel.

6. The method according to claim 1, wherein the measuring channel is removably mounted to the flow channel, the connection of the measuring channel being done after making the polyphase fluid circulate in the flow channel.

7. The method according to claim 1, wherein the measured property is chosen among the individual section of the gaseous phase and of the liquid phase in the pipe, and the individual density of each phase, the first sensor being chosen among a receiver for receiving gamma photons emitted by a gamma ray source, a receiver for receiving an electromagnetic signal emitted by an electromagnetic radiation source with a frequency below 60 GHz, an impedance measurement sensor, a microwave measurement sensor, and an optical measurement sensor.

8. The method according to claim 1, further comprising: controlling one or more valves of the valve manifold to make it possible, without stopping the continuous flow of the polyphase fluid in the flow channel, to take the pressurized liquid phase sample, and to make it possible, without stopping the continuous flow of polyphase fluid in the flow channel, to take a pressurized gaseous phase sample.

9. A process for measuring at least one property of a polyphase fluid continuously circulating in a pipe, the property being computed using at least one piece of information received from a first sensor placed opposite the fluid circulating in the pipe, the polyphase fluid comprising at least one liquid phase and a gaseous phase, the process comprising:
calibrating the measurement by carrying out a calibration method, the calibration method comprising:
circulating a pressurized polyphase fluid continuously through a flow channel connected to the pipe;
connecting a measuring channel to the flow channel via a valve manifold, the measuring channel being provided with a second sensor delivering at least one piece of information similar to that delivered by the first sensor;
taking a first sample of pressurized gaseous phase from the flow channel and transferring the first sample of pressurized gaseous phase to the measuring channel through the valve manifold;
activating the second sensor to collect a first piece of information representative of the first sample of pressurized gaseous phase present in the measuring channel;
taking at least one second sample of pressurized liquid phase from the flow channel and transferring the second pressurized sample to the measuring channel through the valve manifold;
activating the second sensor to collect at least one second piece of information representative of the at least one second sample of pressurized liquid phase present in the measuring channel opposite the second sensor;
computing at least one calibration coefficient connecting the property to the at least one piece of information received from the first sensor, based on the first piece of information and the at least one second piece of information; and
continuously measuring the property comprising:
activating the first sensor to collect a piece of information representative of the polyphase fluid circulating in the pipe; and
computing the measured parameter based on at least one piece of representative information received from the first sensor and at least one calibration coefficient determined during the calibration step.

10. A device for measuring at least one property of a pressurized polyphase fluid continuously circulating in a pipe, the polyphase fluid comprising at least one liquid phase and at least one gaseous phase, the device comprising:
a measuring assembly, the measuring assembly comprising:
a section of the pipe having a first sensor capable of interacting with the fluid circulating in the section of the pipe to create at least one piece of information; and
a means for computing the at least one property from the information received from the first sensor; and
a calibration assembly, the calibration assembly comprising:
a flow channel connected to the pipe to allow the continuous circulation of at least part of the polyphase fluid circulating in the pipe during a calibration step;
a measuring channel separate from the flow channel, the measuring channel having a second sensor delivering at least one piece of information similar to that delivered by the first sensor; and
a valve manifold connecting the measuring channel to the flow channel, the valve manifold comprising:
at least one pressurized transport channel for flowing a first sample of pressurized gaseous phase from the flow channel to the measuring channel, the at least one pressurized transport channel connecting the measuring channel to a gaseous phase collection point in the flow channel; and
at least one transport channel for transporting a second sample of pressurized liquid phase from the flow channel to the measuring channel, the at least one transport channel connecting the measuring channel to a liquid phase collection point on the flow channel.

11. The device according to claim 10, wherein the flow channel is formed by means of the section of the pipe having the first sensor, and the measuring channel is formed by means of a bypass of the pipe, the second sensor being separate from the first sensor.

12. The device according to claim 11, wherein the measuring channel is removably mounted on the flow channel via the valve manifold.

13. The device according to claim 10, wherein the second sensor is made up of the first sensor the measuring channel being formed by means of the section of the pipe provided with the first sensor, and the flow channel being formed by a bypass of the pipe bled upstream and downstream of the measuring channel.

14. The device according to claim 10, wherein the pipe defines a first venturi opposite the first sensor, the measuring channel defining a second venturi opposite the second sensor.

15. The device according to claim 10, wherein the valves of the valve manifold are capable of being controlled to make it possible, without stopping the continuous flow of polyphase fluid in the flow channel, to take a pressurized gaseous phase sample and transport it towards the measuring channel and to make it possible, without stopping the continuous flow of polyphase fluid in the flow channel, to take a pressurized liquid phase sample and transport it towards the measuring channel.

* * * * *